Patented Oct. 17, 1944

2,360,586

UNITED STATES PATENT OFFICE 2,360,586

PROCESS FOR THE MANUFACTURE OF DIRECT CONSUMPTION SUGAR

Harry M. Row, Rosedale, La.

No Drawing. Application January 27, 1941,
Serial No. 376,224

6 Claims. (Cl. 127—50)

The present invention relates to a process for the manufacture of sugar and more particularly to the manufacture of direct consumption sugar by the sulphitation process.

At present in the manufacture of direct consumption sugar by the sulphitation process, the raw cane juice is treated with sulphur dioxide gas to increase its natural acidity, following which milk of lime is added to neutralize the sulphur dioxide. The juice so treated is then heated to approximately 210-215 degrees F. and passed into a tank or other apparatus in which the suspended solids in the juice may subside and a clear or clarified juice be obtained by decantation preparatory to concentrating the said juice into massecuite which in turn is run into a centrifugal where the grain sugar is separated from the molasses. In manufacturing this type of sugar, i. e., direct consumption sugar, settlers sometimes called subsiders, clarifiers or defecators, have been employed either of the batch or intermittent type. The use of continuous clarifiers or settlers was not great because of the inability to consistently produce juices of good clarity and quality. It has been found that the clarity and quality of the juice produced in the clarifier is important in the processing of a high grade sugar and molasses and that the juice if turbid, when it is processed to sugar and molasses, gives an inferior product.

A continuous clarifier as compared with an open settler type possesses marked advantages in more efficient operation, increased yield and better control of materials. This follows from the fact that in a continuous clarifier a continuous stream of juice is fed to the clarifier at all times, there being no interruption as in the open settler type for solids to subside so that a clear juice may be decanted. Other advantages are apparent to those skilled in this art.

The continuous clarifier has worked with a certain degree of success in clarifying juice for the production of raw sugar, but in the making of direct consumption sugar through the sulphitation process where the raw juice is treated with sulphur dioxide, the continuous clarifier has not satisfactorily and consistently removed nonsucrose materials. The juice after it comes from the continuous clarifier is milky and turbid resulting in an inferior quality of sugar and molasses produced.

It is the primary object of the present invention to provide a process for the production of direct consumption sugar by the sulphitation process wherein a continuous clarifier may be used with all its advantages and at the same time produce sugar and molasses of as high or better grade as now obtained by use of the open settler clarifier.

Another object is to provide a process for the production of direct consumption sugar and molasses by the continuous clarifier method where the sugar and molasses processed are consistently of a good grade and where the nonsucrose materials are more effectively and completely eliminated in the clarifier.

Another object is to provide a process for the production of sugar in which the quality of the end product is consistently the same due to the control of the temperature of the juice as it enters the continuous clarifier.

In its broadest concept this invention comprises the step, in the manufacture of direct consumption sugar by the sulphitation process, of lowering the temperature of the juice prior to passing it through a continuous clarifier which is closed. The juice may be cooled in any suitable manner such as causing the juice to circulate through coils which are surrounded by a cooler liquid or passing it through a water cooled jacket before it enters the continuous clarifier.

Other and further objects and advantages of this invention will be apparent from the following description thereof and from the claims appended thereto.

In carrying out the present invention of processing sugar and its by product molasses, from sugar juices by the sulphitation method, the juice is first treated with sulphur dioxide and then with lime. The juice is then heated in juice heaters to a temperature in the range of 200°–220° F. and higher, preferably 212°–220° F., for the purpose of coagulating certain nitrogenous compounds normally present in the juice, to break down and precipitate organic compounds of silica, and to complete the reaction between the lime and the sulphur dioxide. The temperature of the juice is then reduced below that reached in the juice heaters to a temperature ranging from approximately 180°–200° F. and preferably in the range between 180°–185°F. The juice at this reduced temperature is run into the continuous clarifier preparatory to further processing steps.

The gist of this invention is the step in the above described process of reducing the temperature of the juice before passing it into the continuous clarifier for further processing. The temperature of the juice in the juice heaters is normally 210°–215° F. but it may be higher. The operating range of temperature may vary with pressure if it is found desirable to work under pressure conditions varying from atmospheric pressure. Best results have been obtained when the temperature of the juice is reduced from 212°–220° F. to 185° F. before passing it into the continuous clarifier, but other temperature ranges have been found effective it being understood that the reason for lowering the temperature of the juice from 212°–220° F. to a lower temperature before passing it into the clarifier is to substantially eliminate the turbidity in the juice heretofore found therein after clarification in the continuous clarifier when it was passed from the juice heaters into the continuous clarifier without any reduction of the temperature of the juice prior to its entrance into the said clarifier.

The apparatus for cooling the juice before passing it into the continuous clarifier may be of any suitable nature. A water cooled jacket is convenient.

Prior to the present invention, the use of the continuous clarifier or settler has not proven efficient in the processing of direct consumption sugar and molasses from sucrose juices through the sulphitation process. Through the results of the present invention the operation of such continuous clarifier or settler is made successful in relation to the production of direct consumption sugar. Moreover the improved process improves the clarity and quality of the sulphitation sucrose juices and the sugar and molasses processed therefrom, increases the capacity of the continuous clarifier or settler in the processing of sugar and molasses from sulphitation sucrose juice, and makes more uniform in quality the sugar and molasses so produced.

The reduction of non-sucrose content of the juice by the three successive steps of heating, cooling and continuously clarifying yields a purer juice, thence a purer syrup and from this is obtained a purer and better sugar and molasses.

Various modifications of this invention will be apparent to those skilled in this art it being understood that the broad concept of this invention is the treatment of the juice before it enters into the continuous clarifier so that the effluent juice from the said clarifier is substantially clear. I have described as one form of my invention the step of reducing the temperature of the juice from the juice heater before it enters the continuous clarifier but it is believed obvious that other physical variants may be altered to accomplish the results of obtaining a juice of improved clarity and quality from the continuous clarifier and it is desired to be limited only by the scope of the appended claims.

What is claimed is:

1. In the method of manufacturing direct consumption sugar using a continuous closed clarifier, the steps of treating sugar juices with sulfur dioxide and lime, heating the treated sugar juice in a juice heater to a temperature ranging between 212°–220° F., reducing the temperature of the juice after it leaves the juice heater to a temperature of about 180° F., and passing the juice at the reduced temperature into the continuous clarifier.

2. In the method of manufacturing direct consumption sugar using a continuous closed clarifier, the steps of treating sugar juices with sulfur dioxide and lime, heating the treated sugar juice to a temperature in excess of 200° F., reducing the temperature of the heated juice to a range between 180°–185° F., and passing the juice at the reduced temperature into the continuous clarifier.

3. In the manufacture of direct consumption sugar by the sulphitation process using a continuous clarifier, the steps of treating the sugar juice with sulfur dioxide and then lime, heating the sugar juice in a juice heater to a temperature in the range of 210°–220° F., reducing the temperature of the juice after it leaves the juice heater to a temperature range between 180°–185° F., and passing the juice at the reduced temperature into the continuous clarifier.

4. In the production method of direct consumption sugar from sugar cane, which involves the process of clarification in which lime and sulphur dioxide are employed producing in the juice a precipitate of calcium sulphite and some calcium sulphite in solution, the step which consists in reducing the temperature of the juice going into the clarifier to approximately 180 degrees F. to render less soluble the calcium sulphite.

5. In the production method of direct consumption sugar from sugar cane, which involves the process of clarification in which lime and sulphur dioxide are employed producing in the juice a precipitate of calcium sulphite and some calcium sulphite in solution, the step which consists in reducing the temperature of the juice going into the clarifier to approximately 185 degrees F. to reduce the solubility of the calcium sulphite to a minimum and result in its maximum elimination to decrease the turbidity of the juice and enhance its value.

6. In the method of manufacturing direct consumption sugar using a closed clarifier, the steps of treating sugar juice with sulfur dioxide and lime, heating the sugar juice to a temperature in excess of 200° F., reducing the temperature of the sugar juice to a temperature of about 180° F. and passing the sugar juice at the reduced temperature into the clarifier.

HARRY M. ROW.